United States Patent
Liu

(10) Patent No.: US 10,250,613 B2
(45) Date of Patent: Apr. 2, 2019

(54) DATA ACCESS METHOD BASED ON CLOUD COMPUTING PLATFORM, AND USER TERMINAL

(71) Applicants: TENCENT TECHNOLOGY (SHENZHEN) COMPANY LIMITED, Shenzhen, Guangdong (CN); HUNAN UNIVERSITY, Changsha, Hunan (CN)

(72) Inventor: Qin Liu, Shenzhen (CN)

(73) Assignees: TENCENT TECHNOLOGY (SHENZHEN) COMPANY LIMITED, Shenzhen, Guangdong (CN); Hunan University, Hunan (CN)

( * ) Notice: Subject to any disclaimer, the term of this patent is extended or adjusted under 35 U.S.C. 154(b) by 0 days.

(21) Appl. No.: 15/554,477

(22) PCT Filed: May 24, 2016

(86) PCT No.: PCT/CN2016/083117
§ 371 (c)(1),
(2) Date: Aug. 30, 2017

(87) PCT Pub. No.: WO2017/036190
PCT Pub. Date: Mar. 9, 2017

(65) Prior Publication Data
US 2018/0041520 A1    Feb. 8, 2018

(30) Foreign Application Priority Data
Aug. 31, 2015   (CN) .......................... 2015 1 0546501

(51) Int. Cl.
*H04L 29/06* (2006.01)
*H04L 9/06* (2006.01)
(Continued)

(52) U.S. Cl.
CPC .......... *H04L 63/108* (2013.01); *H04L 9/0618* (2013.01); *H04L 63/0281* (2013.01);
(Continued)

(58) Field of Classification Search
CPC . H04L 63/108; H04L 63/0428; H04L 63/166; H04L 63/061; H04L 63/0281;
(Continued)

(56) References Cited

U.S. PATENT DOCUMENTS 7,945,776 B1 *   5/2011   Atzmony ................ G06F 21/31
                                                    713/164
8,141,142 B2 *   3/2012   Hourselt ............. H04L 63/0428
                                                    726/10
(Continued)

FOREIGN PATENT DOCUMENTS

CN    102882923 A    1/2013
CN    103107889 A    5/2013
(Continued)

OTHER PUBLICATIONS

International Search Report of PCT/CN2016/083117 dated Jul. 28, 2016.
(Continued)

*Primary Examiner* — Darren B Schwartz
(74) *Attorney, Agent, or Firm* — Sughrue Mion, PLLC

(57) ABSTRACT

A data access method based on a cloud computing platform, and a user terminal, are provided. The method is performed by a user terminal, and the method includes obtaining an access request for a data ciphertext of the cloud computing platform, the access request including a decryption key, and the decryption key including a user precise identity identifier and a user attribute identifier. The method further includes decrypting the data ciphertext into a data plaintext, in response to the user precise identity identifier belonging to
(Continued)

an identity identifier set included in an access structure of the data ciphertext and/or in response to the user attribute identifier belonging to a user attribute identifier set included in the access structure of the data ciphertext.

15 Claims, 3 Drawing Sheets

(51) Int. Cl.
H04L 12/24 (2006.01)
H04L 29/08 (2006.01)
(52) U.S. Cl.
CPC ........ *H04L 63/0428* (2013.01); *H04L 63/061* (2013.01); *H04L 63/166* (2013.01); *H04L 41/5003* (2013.01); *H04L 41/5019* (2013.01); *H04L 67/10* (2013.01)
(58) Field of Classification Search
CPC ... H04L 9/0618; H04L 41/5003; H04L 67/10; H04L 41/5019
See application file for complete search history.

(56) References Cited

U.S. PATENT DOCUMENTS

| | | | | |
|---|---|---|---|---|
| 8,566,952 | B1* | 10/2013 | Michaels | G06F 21/32 |
| | | | | 726/27 |
| 8,869,235 | B2* | 10/2014 | Qureshi | G06F 21/10 |
| | | | | 726/1 |
| 9,769,124 | B2* | 9/2017 | Yan | H04L 9/0847 |
| 9,774,586 | B1* | 9/2017 | Roche | H04L 63/08 |
| 2002/0083178 | A1* | 6/2002 | Brothers | G06F 21/10 |
| | | | | 709/226 |
| 2003/0007640 | A1* | 1/2003 | Harada | G06F 21/10 |
| | | | | 380/270 |
| 2004/0170278 | A1* | 9/2004 | Schipper | H04L 63/0442 |
| | | | | 380/239 |
| 2004/0230540 | A1* | 11/2004 | Crane | G06F 21/6218 |
| | | | | 705/76 |
| 2006/0190736 | A1* | 8/2006 | John | H04L 63/102 |
| | | | | 713/182 |
| 2007/0086593 | A1* | 4/2007 | Denning | H04L 63/0428 |
| | | | | 380/286 |
| 2007/0130627 | A1* | 6/2007 | Yoshioka | G06F 21/645 |
| | | | | 726/27 |
| 2007/0240206 | A1* | 10/2007 | Wu | H04L 63/12 |
| | | | | 726/8 |
| 2008/0313716 | A1* | 12/2008 | Park | H04L 63/104 |
| | | | | 726/4 |
| 2009/0106550 | A1* | 4/2009 | Mohamed | H04L 63/045 |
| | | | | 713/156 |
| 2009/0119340 | A1* | 5/2009 | Johnson | G06F 21/554 |
| 2009/0249063 | A1* | 10/2009 | Sakurai | G06F 21/34 |
| | | | | 713/159 |
| 2010/0098249 | A1* | 4/2010 | Shin | H04L 9/0872 |
| | | | | 380/44 |
| 2011/0213971 | A1* | 9/2011 | Gurel | G06F 21/10 |
| | | | | 713/165 |
| 2012/0174193 | A1* | 7/2012 | Dietrich | G06F 21/33 |
| | | | | 726/4 |
| 2013/0054976 | A1* | 2/2013 | Brown | G06F 21/6218 |
| | | | | 713/189 |
| 2014/0331103 | A1* | 11/2014 | Grube | H04L 67/06 |
| | | | | 714/763 |
| 2015/0281193 | A1* | 10/2015 | Zheng | H04L 9/085 |
| | | | | 713/171 |
| 2016/0063258 | A1* | 3/2016 | Ackerly | G06F 21/602 |
| | | | | 713/189 |
| 2016/0253517 | A1* | 9/2016 | Mori | G09C 1/00 |
| | | | | 713/165 |
| 2016/0314052 | A1* | 10/2016 | Gladwin | H04L 67/06 |
| 2016/0352752 | A1* | 12/2016 | Bush | H04L 63/0838 |
| 2017/0318005 | A9* | 11/2017 | White | H04L 63/0428 |

FOREIGN PATENT DOCUMENTS

| | | |
|---|---|---|
| CN | 103532981 A | 1/2014 |
| CN | 103618729 A | 3/2014 |
| CN | 103634331 A | 3/2014 |
| CN | 104009987 A | 8/2014 |
| CN | 104378386 A | 2/2015 |

OTHER PUBLICATIONS

Communication dated Feb. 2, 2019 from the State Intellectual Property Office of the P.R.C. in counterpart CN application No. 201510546501.4.

"Research on fine-grained attribute-based encryption for dynamic cloud access control", Inner Mongolia University of Science & Technology, Jun. 5, 2015. (56 pages total).

\* cited by examiner

DATA ACCESS METHOD BASED ON CLOUD COMPUTING PLATFORM, AND USER TERMINAL

CROSS-REFERENCE TO RELATED APPLICATIONS

This application is a U.S. national stage application under 35 U.S.C. § 371 of International Patent Application No. PCT/CN2016/083117 filed on May 24, 2016, which claims priority from Chinese Patent Application No. 201510546501.4, entitled "DATA ACCESS METHOD BASED ON CLOUD COMPUTING PLATFORM, AND USER TERMINAL," filed on Aug. 31, 2015, in the Chinese Patent Office, the disclosures of which are incorporated herein by reference in their entireties.

BACKGROUND

1. Field

Methods and apparatuses consistent with example embodiments relate to cloud computing technologies, and specifically, to a data access method based on a cloud computing platform, and a user terminal.

2. Description of Related Art

In an age of big data, a cloud computing platform is often used for storing massive data. The massive data stored in the cloud computing platform often relate to personal privacy data, for example, personal medical records. During actual application, the cloud computing platform is often managed and maintained by a cloud service provider (Cloud Service Provider, CSP), and the cloud service provider is often an enterprise aiming at profiting. When an enterprise signs a service level agreement (Service Level Agreement, LSA) with the cloud service provider, the enterprise may perform authorization of users in the enterprise, so that the users in the enterprise may not only store data to the cloud computing platform, but also access data of the cloud computing platform. It is found in practices that once the users in the enterprise are authorized, the users may access all the data in the cloud computing platform, and fine-grained access control is difficult to implement.

SUMMARY

According to example embodiments, there is provided a data access method based on a cloud computing platform, the method being performed by a user terminal, and the method including obtaining an access request for a data ciphertext of the cloud computing platform, the access request including a decryption key, and the decryption key including a user precise identity identifier and a user attribute identifier. The method further includes decrypting the data ciphertext into a data plaintext, in response to the user precise identity identifier belonging to an identity identifier set included in an access structure of the data ciphertext and/or in response to the user attribute identifier belonging to a user attribute identifier set included in the access structure of the data ciphertext.

According to example embodiments, there is provided a user terminal that performs a data access, based on a cloud computing platform, the user terminal including a memory storing instructions, and a processor configured to execute the instructions to implement an obtaining unit configured to obtain an access request for a data ciphertext of the cloud computing platform, the access request including a decryption key, and the decryption key including a user precise identity identifier and a user attribute identifier. The processor is further configured to execute the instructions to implement a decryption unit configured to decrypt the data ciphertext into a data plaintext, in response to the user precise identity identifier belonging to an identity identifier set included in an access structure of the data ciphertext and/or in response to the user attribute identifier belonging to a user attribute identifier set included in the access structure of the data ciphertext.

According to example embodiments, there is provided a non-transitory computer-readable storage medium storing a program including instructions to cause a computer of a user terminal to obtain an access request for a data ciphertext of a cloud computing platform, the access request including a decryption key, and the decryption key including a user precise identity identifier and a user attribute identifier. The instructions further cause the computer to decrypt the data ciphertext into a data plaintext, in response to the user precise identity identifier belonging to an identity identifier set included in an access structure of the data ciphertext and/or in response to the user attribute identifier belonging to a user attribute identifier set included in the access structure of the data ciphertext.

DETAILED DESCRIPTION OF EXAMPLE EMBODIMENTS

Example embodiments include a data access method based on a cloud computing platform, and a user terminal, so that fine-grained access control can be effectively performed on data of the cloud computing platform. Details are respectively described in the following.

To better understand the data access method based on the cloud computing platform, and the user terminal that are disclosed in the example embodiments, a network architecture applicable to the example embodiments are described in the following.

Figure 1:
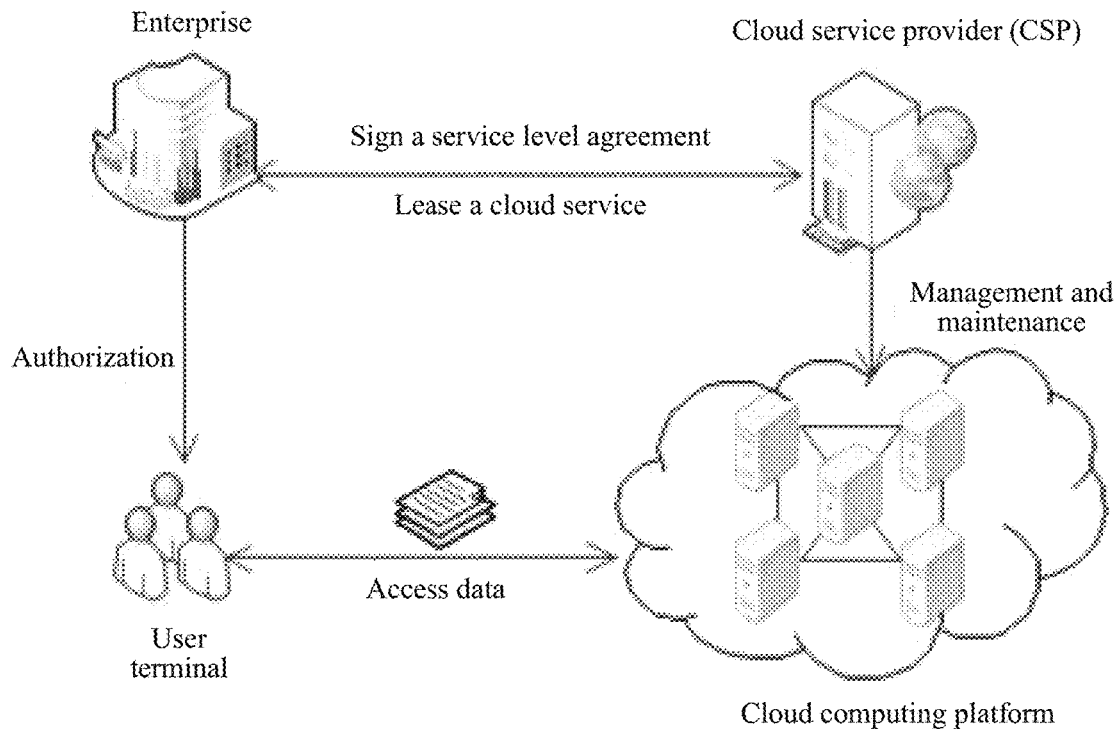
FIG. 1 is a schematic diagram of a network architecture based on a cloud computing platform according to example embodiments.

FIG. 1 is a schematic diagram of a network architecture based on a cloud computing platform according to example embodiments. The network architecture based on the cloud computing platform shown in FIG. 1 is a network architecture applicable to these example embodiments. Other types of network architectures are also applicable to these example embodiments. In the network architecture shown in FIG. 1, an enterprise may sign a service level agreement (Service Level Agreement, SLA) with a cloud service provider (CSP), so that the enterprise can lease a cloud service from the CSP. The CSP may perform management and maintenance operations on the cloud computing platform, and the enterprise may authorize user terminals (that is, employees) in the enterprise to perform data query and sharing (i.e., access data) on the cloud computing platform. Further, in the network architecture shown in FIG. 1, the user terminal may be used as a data advocator for authorizing other users to query and access data, or may be used as an access user for querying the cloud computing platform for data within permission and accessing data within permission.

In the network architecture shown in FIG. 1, the user terminal may apply to a department, to which the user terminal in the enterprise is subordinate, for a key, and the enterprise may apply to a trusted third party for the key. That is, in the network architecture shown in FIG. 1, a key generation method with a hierarchical structure is supported, to effectively avoid problems such as a performance bottleneck and a single point failure, and to better meet requirements for accessing data by a user in any time at any place. The enterprise may operate a key generation module (HMIBE) to generate a decryption key $Kd,u$ and a query key $Ks,u$ for a user terminal u by using the key generation method with a hierarchical structure. Correspondingly, the decryption key $Kd,u$ may include a user precise identity identifier $Sku$ and a user attribute identifier $bu$. The user precise identity identifier $Sku$, for example, may include an employee identity number (such as 4021434), a mobile phone number, an identity card number, even an email address, a social account, and/or the like, and the user attribute identifier $bu$, for example, may include a department (such as a financial department or a sales department) to which the user is subordinate, a user gender (such as "male"), a user title (such as "professor"), and/or the like. The query key $Ks,u$ may be mainly used for querying the cloud computing platform for data and data matched to an authorized query condition Q. In the network architecture shown in FIG. 1, in these example embodiments, fine-grained access control may be effectively performed on data of the cloud computing platform by combining the user precise identity identifier and the user attribute identifier that are included in the decryption key.

Figure 2:
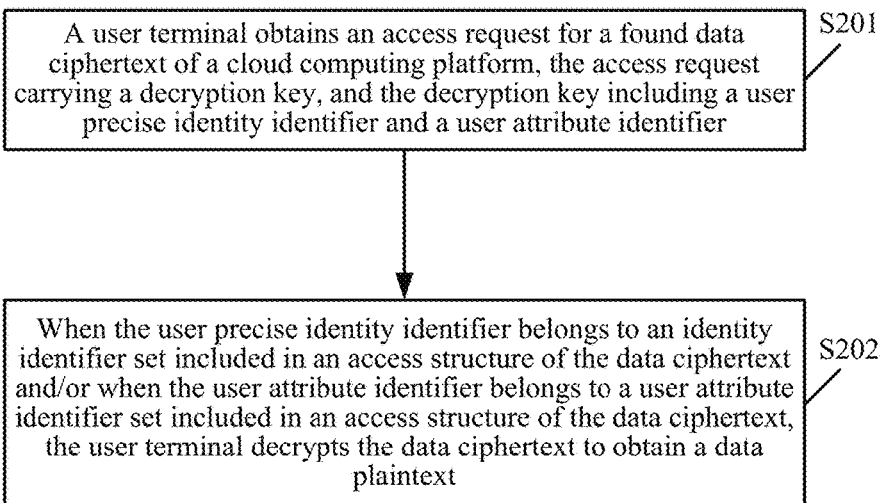
FIG. 2 is a schematic flowchart of a data access method based on a cloud computing platform according to example embodiments.

FIG. 2 is a schematic flowchart of a data access method based on a cloud computing platform according to example embodiments. As shown in FIG. 2, the data access method based on a cloud computing platform may include the following operations.

In operation S201, a user terminal obtains an access request for a found data ciphertext of the cloud computing platform, the access request carrying a decryption key, and the decryption key including a user precise identity identifier and a user attribute identifier.

In these example embodiments, the user terminal may receive the access request that is input by a user (such as an enterprise employee) and that is for the found data ciphertext of the cloud computing platform, and the access request may carry the decryption key including the user precise identity identifier and the user attribute identifier.

In operation S202, when the user precise identity identifier belongs to an identity identifier set included in an access structure of the data ciphertext and/or when the user attribute identifier belongs to a user attribute identifier set included in an access structure of the data ciphertext, the user terminal decrypts the data ciphertext to obtain a data plaintext.

In these example embodiments, assuming that the access structure of the data ciphertext Fi is Ai, and the access structure Ai equals {{"an employee identity number=4021434", "an employee identity number=4021436"}, {"a financial department", "a sales department"}}, {"an employee identity number=4021434", "an employee identity number=4021436"} indicates an identity identifier set U1 included in the access structure, and {"a financial department", "a sales department"} indicates a user attribute identifier set U2 included in the access structure. Ai indicates that the data ciphertext can be accessed not only by users with user precise identity identifiers $Sku$ being "an employee identity number=4021434" and "an employee identity number=4021436" in U1, but also by users with user attribute identifiers $bu$ being "a financial department" and "a sales department" in U2. Further, assuming that the user precise identity identifier $Sku$ included in a decryption key $Kd,u$ carried in the access request in operation S201 is "4021434", and/or the user attribute identifier $bu$ included in the decryption key $Kd,u$ carried in the access request is "a financial department", the user terminal may determine that the user precise identity identifier $Sku$ "4021434" belongs to the identity identifier set U1 included in the access structure Ai of the data ciphertext Fi, and/or the user terminal may determine that the user attribute identifier $bu$ "a financial department" belongs to the user attribute identifier set U2 included in the access structure Ai of the data ciphertext Fi, so that a data plaintext is restored.

It can be seen that in a method described in FIG. 1, a decryption key may include a user precise identity identifier and a user attribute identifier, and when the user precise identity identifier belongs to an identity identifier set included in an access structure of a data ciphertext to be accessed, and/or when the user attribute identifier belongs to a user attribute identifier included in an access structure of a data ciphertext to be accessed, the data ciphertext to be accessed is decrypted to obtain a data plaintext. It can be seen that for the method described in FIG. 1, fine-grained access control may be effectively performed on data of the cloud computing platform by combining the user precise identity identifier and the user attribute identifier that are included in the decryption key.

Figure 3:
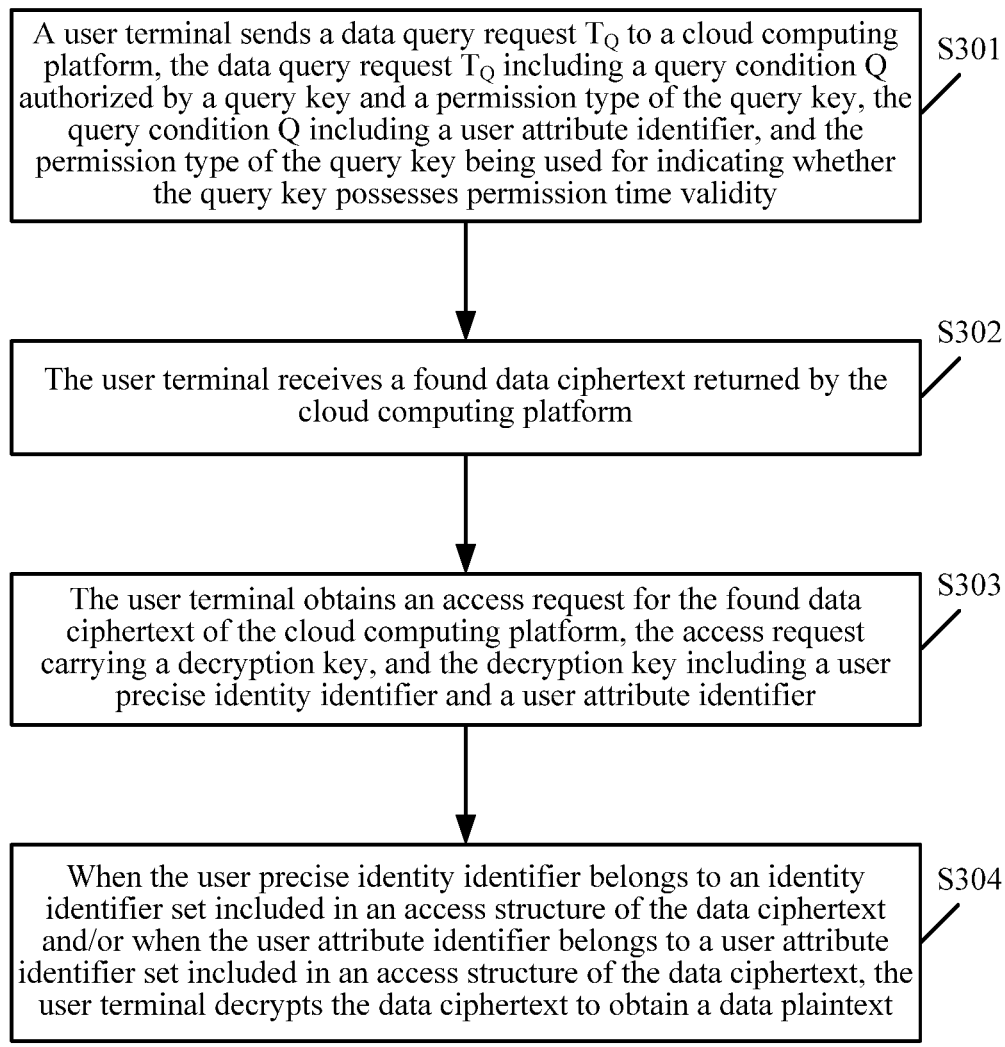
FIG. 3 is a schematic flowchart of another data access method based on a cloud computing platform according to example embodiments.

FIG. 3 is a schematic flowchart of another data access method based on a cloud computing platform according to example embodiments. In the data access method based on a cloud computing platform shown in FIG. 3, fine-grained secure data access, a fine-grained secure data query mechanism, and dynamic key permission management may be implemented based on the cloud computing platform. As shown in FIG. 3, the data access method based on a cloud computing platform may include the following operations.

in operation S301, a user terminal sends a data query request TQ to the cloud computing platform, the data query request TQ including a query condition Q authorized by a query key and including a permission type of the query key, the query condition Q including a user attribute identifier, and the permission type of the query key being used for indicating whether the query key possesses permission time validity.

In these example embodiments, the query condition Q authorized by the query key may include one or more user attribute identifiers, and these user attribute identifiers may compose keywords for querying.

In these example embodiments, after the cloud computing platform receives the data query request TQ sent by the user terminal, the cloud computing platform may identify, according to the permission type of the query key, whether the query key possesses permission time validity. When the cloud computing platform identifies, according to the permission type of the query key, that the query key does not possess the permission time validity, the cloud computing platform may query, from all the stored data ciphertexts by the cloud computing platform, an index ciphertext I of the data ciphertext and a data ciphertext matched to the user attribute identifier included in the query condition Q, to obtain a found data ciphertext. When the cloud computing platform identifies, according to the permission type of the query key, that the query key possesses the permission time validity, the cloud computing platform may send the query request TQ to a CSP, so that the CSP re-encrypts the index ciphertext I of the data ciphertext and the data ciphertext matched to the user attribute identifier included in the query condition Q in all the data ciphertexts stored in the cloud computing platform; and when the cloud computing platform determines that a current time of the cloud computing platform belongs to a time defined by the permission time validity possessed by the query key, the cloud computing platform may query the re-encrypted index ciphertext I of the data ciphertext and the re-encrypted data ciphertext matched to the user attribute identifier included in the query condition Q, to obtain the found data ciphertext.

In these example embodiments, when the cloud computing platform determines that the current time of the cloud computing platform does not belong to the time defined by the permission time validity possessed by the query key, the cloud computing platform may send, to the user terminal, prompt information used for prompting failure of the query key, to cancel the permission of the query key.

In these example embodiments, when the permission type of the query key is used for indicating that the query key possesses the permission time validity, the permission type of the query key may include the time defined by the permission time validity (for example, the time is January 2014). When the permission type of the query key is used for indicating that the query key does not possess the permission time validity, the permission type of the query key may not include the time defined by the permission time validity.

In these example embodiments, a user may store a data ciphertext Fi in a form of a file to the cloud computing platform. Before storing the data ciphertext Fi to the cloud computing platform, the user may first establish an index ciphertext Ii for the data ciphertext Fi, then designate an access structure Ai for the data ciphertext Fi, and finally store the access structure Ai, the data ciphertext Fi, and index ciphertext Ii together to the cloud computing platform. The access structure Ai may include an identity identifier set U1 and a user attribute identifier set U2, and the index ciphertext Ii may include several user attribute identifiers.

In operation S302, the user terminal receives a found data ciphertext returned by the cloud computing platform.

In operation S303, the user terminal obtains an access request for the found data ciphertext of the cloud computing platform, the access request carrying a decryption key, and the decryption key including a user precise identity identifier and a user attribute identifier.

In these example embodiments, the user terminal may receive the access request that is input by a user (such as an enterprise employee) and that is for the found data ciphertext of the cloud computing platform, and the access request may carry the decryption key including the user precise identity identifier and the user attribute identifier.

In operation S304, when the user precise identity identifier belongs to an identity identifier set included in an access structure of the data ciphertext and/or when the user attribute identifier belongs to a user attribute identifier set included in an access structure of the data ciphertext, the user terminal decrypts the data ciphertext to obtain a data plaintext.

In these example embodiments, assuming that the access structure of the data ciphertext Fi is Ai, and the access structure Ai equals {{"an employee identity number=4021434", "an employee identity number=4021436"}, {"a financial department", "a sales department"}}, {"an employee identity number=4021434", "an employee identity number=4021436"} indicates an identity identifier set U1 included in the access structure, and {"a financial department", "a sales department"} indicates a user attribute identifier set U2 included in the access structure.

Ai indicates that the data ciphertext can be accessed not only by users with user precise identity identifiers Sku being "an employee identity number=4021434" and "an employee identity number=4021436" in U1, but also by users with user attribute identifiers bu being "a financial department" and "a sales department" in U2. Further, assuming that the user precise identity identifier Sku included in a decryption key Kd,u carried in the access request in operation S303 is "4021434", and/or the user attribute identifier bu included in the decryption key Kd,u carried in the access request is "a financial department", the user terminal may determine that the user precise identity identifier Sku "4021434" belongs to the identity identifier set U1 included in the access structure Ai of the data ciphertext Fi, and/or the user terminal may determine that the user attribute identifier bu "a financial department" belongs to the user attribute identifier set U2 included in the access structure Ai of the data ciphertext Fi, so that a data plaintext is restored.

As an optional implementation, in operation S303, the access request may further carry the permission type of the decryption key, and the permission type of the decryption key is used for indicating whether the decryption key possesses the permission time validity. Correspondingly, in operation S303, that the user terminal restores the data ciphertext into the data plaintext may include the following operations.

First, the user terminal may identify, according to the permission type of the decryption key, whether the decryption key possesses the permission time validity, and decrypt, if the decryption key does not possess the permission time validity, the data ciphertext to obtain the data plaintext. If the decryption key possesses the permission time validity, the user terminal may determine whether a current time of a local end (e.g., of the user terminal) belongs to a time defined by the permission time validity possessed by the decryption key, and decrypt, if the current time of the local end belongs to the time defined by the permission time validity possessed by the decryption key, the data ciphertext to obtain the data plaintext. On the contrary, if the current time of the local end does not belong to the time defined by the permission time validity possessed by the decryption key, the user terminal may prompt that the decryption key fails, to cancel the permission of the decryption key.

It can be seen that in the method described in FIG. 3, fine-grained secure data access, a fine-grained secure data query mechanism, and dynamic key permission management may be implemented based on the cloud computing platform.

Figure 4:
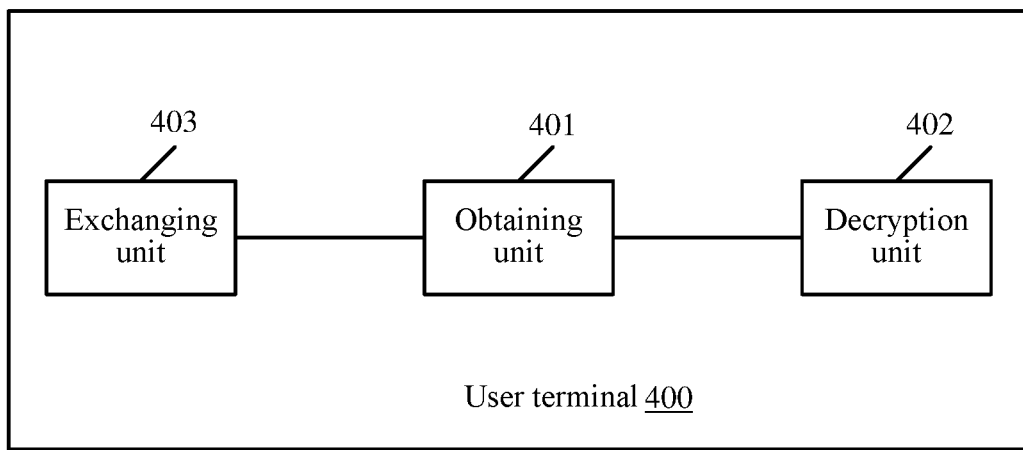
FIG. 4 is a schematic diagram of a user terminal according to example embodiments.

FIG. 4 is a schematic diagram of a user terminal 400 according to example embodiments. The user terminal 400 shown in FIG. 4 may be used for performing a data access method based on a cloud computing platform. As shown in FIG. 4, the user terminal 400 includes an obtaining unit 401 and a decryption unit 402.

The obtaining unit 401 is configured to obtain an access request for a found data ciphertext of the cloud computing platform, the access request carrying a decryption key, and the decryption key including a user precise identity identifier and a user attribute identifier.

The decryption unit 402 is configured to decrypt, when the user precise identity identifier belongs to an identity identifier set included in an access structure of the data ciphertext and/or when the user attribute identifier belongs to a user attribute identifier set included in an access structure of the data ciphertext, the data ciphertext to obtain a data plaintext.

As an optional implementation, the user terminal 400 may further include an exchanging unit 403 configured to send a data query request TQ to the cloud computing platform before the obtaining unit 401 obtains the access request for the found data ciphertext of the cloud computing platform, the data query request TQ including a query condition Q authorized by a query key and including a permission type of the query key, the query condition Q including the user attribute identifier, and the permission type of the query key being used for indicating whether the query key possesses permission time validity. When the cloud computing platform identifies, according to the permission type of the query key, that the query key does not possess the permission time validity, the cloud computing platform may query, from all the stored data ciphertexts, an index ciphertext I of the data ciphertext and a data ciphertext matched to the user attribute identifier, to obtain the found data ciphertext. Alternatively, when the cloud computing platform identifies, according to the permission type of the query key, that the query key possesses the permission time validity, the cloud computing platform may send the query request TQ to a CSP, so that the CSP re-encrypts the index ciphertext I of the data ciphertext and the data ciphertext matched to the user attribute identifier in all the data ciphertexts stored in the cloud computing platform; and when the cloud computing platform determines that a current time of the cloud computing platform belongs to a time defined by the permission time validity possessed by the query key, the cloud computing platform may query the re-encrypted index ciphertext I of the data ciphertext and the re-encrypted data ciphertext matched to the user attribute identifier, to obtain the found data ciphertext.

The exchanging unit 403 may be further configured to receive the found data ciphertext returned by the cloud computing platform.

In these example embodiments, when the cloud computing platform determines that the current time of the cloud computing platform does not belong to the time defined by the permission time validity possessed by the query key, the cloud computing platform may send, to the user terminal 400, prompt information used for prompting failure of the query key, to cancel the permission of the query key.

In example embodiments, the foregoing access request may further carry a permission type of the decryption key, and the permission type of the decryption key may be used for indicating whether the decryption key possesses the permission time validity. Correspondingly, the decryption unit 402 may be further configured to restore the data ciphertext into the data plaintext by identifying, according to the permission type of the decryption key, whether the decryption key possesses the permission time validity, and decrypting, if the decryption key does not possess the permission time validity, the data ciphertext to obtain the data plaintext. On the contrary, if the decryption key possesses the permission time validity, the decryption unit may be further configured to determine whether a current time of a local end (e.g., of the user terminal 400) belongs to a time defined by the permission time validity possessed by the decryption key, and decrypt, if the current time of the local end belongs to the time defined by the permission time validity possessed by the decryption key, the data ciphertext to obtain the data plaintext. On the contrary, if the current time of the local end does not belong to the time defined by the permission time validity possessed by the decryption key, the user terminal 400 may prompt that the decryption key fails, to cancel the permission of the decryption key.

Via the user terminal 400 of the example embodiments, fine-grained secure data access, a fine-grained secure data query mechanism, and dynamic key permission management may be implemented based on the cloud computing platform.

Through these example embodiments, powerful resources and computing capabilities of the cloud computing platform may be fully used, and data security and user privacy may be effectively protected when data is shared.

In conclusion, these example embodiments may have the following effects.

First, fine-grained secure data access may be established. Multiple access structures may be supported, thereby effectively implementing fine-grained access control, and a key generation method with a hierarchical structure may be supported, to effectively avoid problems such as a performance bottleneck and a single point failure. Lightweight encryption/decryption overhead may be supported, better meeting requirements for accessing data by users in any time at any place.

Second, fine-grained secure data query may be implemented. A complex query function of multiple keywords may be supported, better meeting personalized query requirements of the users. Moreover, a fine-grained query permission may be supported, and a user query permission may be associated with an access permission, avoiding potential security risks caused by querying unauthorized data.

Third, dynamic key permission management may be established. Effective cancellation of keys may be implemented for permission types of different, and when data security and user privacy are ensured, powerful computing capabilities and resources of the cloud computing platform may be fully used, effectively reducing overhead of the user terminal 400.

Figure 5:
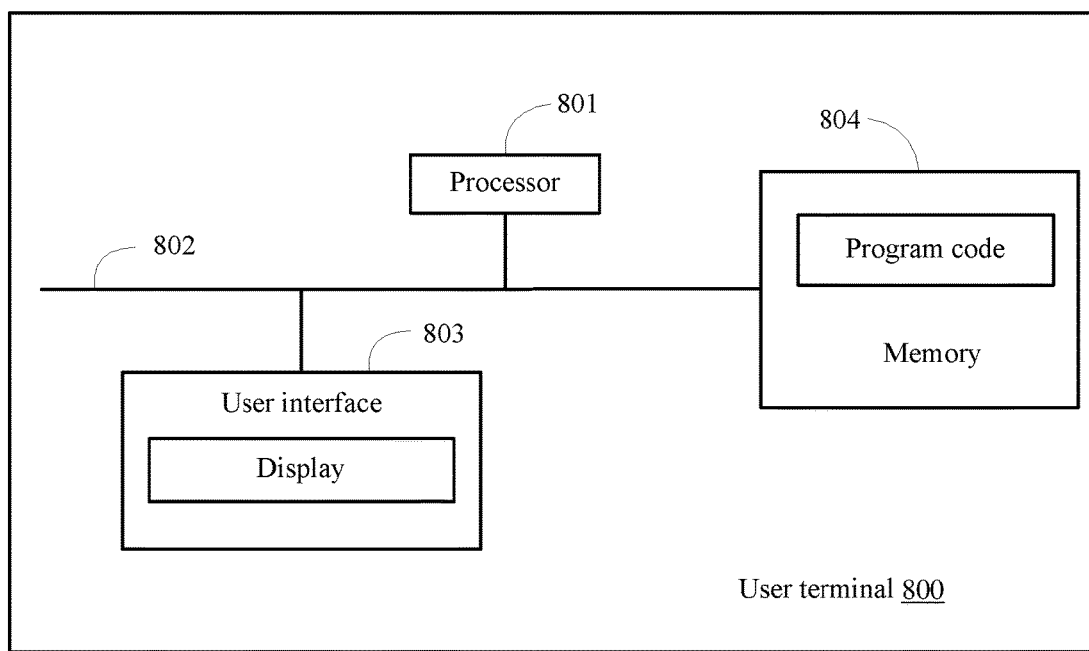
FIG. 5 is a schematic diagram of another user terminal according to example embodiments.

FIG. 5 is a schematic diagram of another user terminal 800 according to example embodiments. As shown in FIG. 5, the user terminal 800 may include at least one processor 801, for example, a CPU, a user interface 803, a memory 804, and at least one communications bus 802. The communications bus 802 is used for implementing connection and communication between these components. The user interface 803 may include a display (Display). Optionally, the user interface 803 may further include a standard wired interface and a standard wireless interface. The memory 804 may be a high-speed RAM memory, or a non-volatile memory (non-volatile memory), for example, at least one magnetic disk memory. Optionally, the memory 804 may be at least one storage apparatus away from the processor 801. The memory 804 stores a group of program code, and the processor 801 invokes the program code stored in the memory 804 to execute the following operations.

The processor 801 obtains an access request for a found data ciphertext of a cloud computing platform, the access request carrying a decryption key, and the decryption key including a user precise identity identifier and a user attribute identifier.

The processor 801 decrypts, when the user precise identity identifier belongs to an identity identifier set included in an access structure of the data ciphertext and/or when the user attribute identifier belongs to a user attribute identifier set included in an access structure of the data ciphertext, the data ciphertext to obtain a data plaintext.

In example embodiments, before the processor 801 invokes the program code stored in the memory 804 to obtain the access request for the found data ciphertext of the cloud computing platform, the processor 801 may invoke the program code stored in the memory 804 to further execute the following operations.

The processor 801 may send a data query request TQ to the cloud computing platform, the data query request TQ including a query condition Q authorized by a query key and a permission type of the query key, the query condition Q including the user attribute identifier, and the permission type of the query key being used for indicating whether the query key possesses permission time validity. When the cloud computing platform identifies, according to the permission type of the query key, that the query key does not possess the permission time validity, the cloud computing platform may query, from all the stored data ciphertexts by the cloud computing platform, an index ciphertext I of the data ciphertext and a data ciphertext matched to the user attribute identifier, to obtain the found data ciphertext.

The processor 801 may receive the found data ciphertext returned by the cloud computing platform.

In example embodiments, when the cloud computing platform identifies, according to the permission type of the query key, that the query key possesses the permission time validity, the cloud computing platform may send the query request TQ to a cloud service provider CSP, so that the CSP re-encrypts the index ciphertext I of the data ciphertext and the data ciphertext matched to the user attribute identifier in all the data ciphertexts stored in the cloud computing platform. When the cloud computing platform determines that a current time of the cloud computing platform belongs to a time defined by the permission time validity possessed by the query key, the cloud computing platform may query the re-encrypted index ciphertext I of the data ciphertext and the re-encrypted data ciphertext matched to the user attribute identifier, to obtain the found data ciphertext.

In example embodiments, the access request may further carry a permission type of the decryption key, the permission type of the decryption key being used for indicating whether the decryption key possesses permission time validity. The processor 801 may invoke the program code stored in the memory 804 to further execute the restoring the data ciphertext to the data plaintext by identifying, according to the permission type of the decryption key, whether the decryption key possesses the permission time validity, and decrypting, if the decryption key does not possess the permission time validity, the data ciphertext to obtain the data plaintext.

In example embodiments, the processor 801 invokes the program code stored in the memory 804 to further execute the following operations: determining, if the decryption key possesses the permission time validity, whether a current time of a local end (e.g., the user terminal 800) belongs to a time defined by the permission time validity possessed by the decryption key; and decrypting, if the current time of the local end belongs to the time defined by the permission time validity possessed by the decryption key, the data ciphertext to obtain the data plaintext.

A person of ordinary skill in the art may understand that all or some of the operations of in various methods of the foregoing example embodiments may be implemented by a program instructing relevant hardware. The program may be stored in a computer readable storage medium. The storage medium includes a read-only memory (Read-Only Memory, ROM), a random access memory (Random Access Memory, RAM), a Programmable Read-only Memory (Programmable Read-only Memory, PROM), an erasable programmable read only memory (Erasable Programmable Read Only Memory, EPROM), a one-time programmable read-only memory (One-time Programmable Read-Only Memory, OTPROM), an Electrically-Erasable Programmable Read-Only Memory (Electrically-Erasable Programmable Read-Only Memory, EEPROM), a Compact Disc Read-Only Memory (Compact Disc Read-Only Memory, CD-ROM), or another optical disc memory, a magnetic disk memory, a magnetic tape memory, and/or any other computer-readable medium that can be used for carrying or storing data.

As is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

A data access method based on a cloud computing platform, and a user terminal that are disclosed in the example embodiments are described above in detail. The principles and implementations of the present disclosure are described through examples in this specification, and the descriptions of the example embodiments are only intended to help understand the methods and core ideas of the present disclosure. A person of ordinary skill in the art may make modifications to the implementations and application scopes according to the ideas of the present disclosure. In conclusion, the content of the specification may not be construed as a limitation to the present disclosure.

What is claimed is:

1. A data access method based on a cloud computing platform, the method being performed by a user terminal, and the method comprising:
   obtaining, by the user terminal, an access request for a data ciphertext of the cloud computing platform, the access request comprising a decryption key, and the decryption key comprising a user precise identity identifier and a user attribute identifier;
   decrypting, by the user terminal, the data ciphertext into a data plaintext, in response to the user precise identity identifier belonging to an identity identifier set comprised in an access structure of the data ciphertext and/or in response to the user attribute identifier belonging to a user attribute identifier set comprised in the access structure of the data ciphertext; and
   before the obtaining the access request:

sending, by the user terminal, a data query request to the cloud computing platform, the data query request comprising a query condition that is authorized by a query key and comprising a permission type of the query key, the query condition comprising the user attribute identifier, and the permission type of the query key indicating whether the query key comprises permission time validity, wherein, in response to the cloud computing platform identifying, based on the permission type of the query key, that the query key does not comprise the permission time validity, the cloud computing platform queries, from data ciphertexts that are stored in the cloud computing platform, an index ciphertext of the data ciphertext and the data ciphertext that are matched to the user attribute identifier comprised in the query condition, to obtain the data ciphertext; and receiving, by the user terminal, the data ciphertext that is obtained, from the cloud computing platform.

2. The method according to claim 1, wherein, in response to the cloud computing platform identifying, based on the permission type of the query key, that the query key comprises the permission time validity, the cloud computing platform:

sends the query request to a cloud service provider, wherein the cloud service provider re-encrypts the index ciphertext of the data ciphertext and the data ciphertext that are matched to the user attribute identifier, in the data ciphertexts stored in the cloud computing platform; and in response to the cloud computing platform determining that a current time of the cloud computing platform corresponds to a time that is defined by the permission time validity comprised in the query key, queries the index ciphertext that is re-encrypted and the data ciphertext that is re-encrypted, to obtain the data ciphertext.

3. The method according to claim 1, wherein the access request further comprises a permission type of the decryption key, the permission type of the decryption key indicating whether the decryption key comprises permission time validity, wherein the method further comprises identifying, by the user terminal, based on the permission type of the decryption key, whether the decryption key comprises the permission time validity, and wherein the decrypting comprises decrypting, by the user terminal, the data ciphertext into the data plaintext, in response to the decryption key being identified to not comprise the permission time validity.

4. The method according to claim 3, further comprising determining, by the user terminal, in response to the decryption key being identified to comprise the permission time validity, whether a current time of the user terminal corresponds to a time that is defined by the permission time validity comprised in the decryption key, wherein the decrypting comprises decrypting, by the user terminal, the data ciphertext into the data plaintext, in response to the current time of the user terminal being determined to correspond to the time defined by the permission time validity comprised in the decryption key.

5. The method according to claim 1, further comprising receiving, by the user terminal, the decryption key and the query key from an enterprise to which a user of the user terminal belongs.

6. A user terminal that performs a data access, based on a cloud computing platform, the user terminal comprising:

a hardware memory storing instructions; and a microprocessor configured to execute the instructions to implement:

an obtaining unit configured to obtain an access request for a data ciphertext of the cloud computing platform, the access request comprising a decryption key, and the decryption key comprising a user precise identity identifier and a user attribute identifier;

a decryption unit configured to decrypt the data ciphertext into a data plaintext, in response to the user precise identity identifier belonging to an identity identifier set comprised in an access structure of the data ciphertext and/or in response to the user attribute identifier belonging to a user attribute identifier set comprised in the access structure of the data ciphertext; and an exchanging unit configured to, before the access request is obtained:

send a data query request to the cloud computing platform, the data query request comprising a query condition that is authorized by a query key and comprising a permission type of the query key, the query condition comprising the user attribute identifier, and the permission type of the query key indicating whether the query key comprises permission time validity, wherein, in response to the cloud computing platform identifying, based on the permission type of the query key, that the query key does not comprise the permission time validity, the cloud computing platform queries, from data ciphertexts that are stored in the cloud computing platform, an index ciphertext of the data ciphertext and the data ciphertext that are matched to the user attribute identifier comprised in the query condition, to obtain the data ciphertext; and receive the data ciphertext that is obtained, from the cloud computing platform.

7. The user terminal according to claim 6, wherein, in response to the cloud computing platform identifying, based on the permission type of the query key, that the query key comprises the permission time validity, the cloud computing platform:

sends the query request to a cloud service provider, wherein the cloud service provider re-encrypts the index ciphertext of the data ciphertext and the data ciphertext that are matched to the user attribute identifier, in the data ciphertexts stored in the cloud computing platform; and in response to the cloud computing platform determining that a current time of the cloud computing platform corresponds to a time that is defined by the permission time validity comprised in the query key, queries the index ciphertext that is re-encrypted and the data ciphertext that is re-encrypted, to obtain the data ciphertext.

8. The user terminal according to claim 6, wherein the access request further comprises a permission type of the decryption key, the permission type of the decryption key indicating whether the decryption key comprises permission time validity, and wherein the decryption unit is further configured to:

identify, based on the permission type of the decryption key, whether the decryption key comprises the permission time validity; and decrypt the data ciphertext into the data plaintext, in response to the decryption key being identified to not comprise the permission time validity.

9. The user terminal according to claim 8, wherein the decryption unit is further configured to:
determine, in the response to the decryption key being identified to comprise the permission time validity, whether a current time of the user terminal corresponds to a time that is defined by the permission time validity comprised in the decryption key; and
decrypt the data ciphertext into the data plaintext, in response to the current time of the user terminal being determined to correspond to the time defined by the permission time validity comprisedin the decryption key.

10. The user terminal according to claim 6, wherein the exchange unit is further configured to receive the decryption key and the query key from an enterprise to which a user of the user terminal belongs.

11. A non-transitory computer-readable storage medium storing a program comprising instructions to cause a computer of a user terminal to:
obtain an access request for a data ciphertext of a cloud computing platform, the access request comprising a decryption key, and the decryption key comprising a user precise identity identifier and a user attribute identifier;
decrypt the data ciphertext into a data plaintext, in response to the user precise identity identifier belonging to an identity identifier set comprised in an access structure of the data ciphertext and/or in response to the user attribute identifier belonging to a user attribute identifier set comprised in the access structure of the data ciphertext; and
before the access request is obtained:
send a data query request to the cloud computing platform, the data query request comprising a query condition that is authorized by a query key and comprising a permission type of the query key, the query condition comprising the user attribute identifier, and the permission type of the query key indicating whether the query key comprises permission time validity,
wherein, in response to the cloud computing platform identifying, based on the permission type of the query key, that the query key does not comprise the permission time validity, the cloud computing platform queries, from data ciphertexts that are stored in the cloud computing platform, an index ciphertext of the data ciphertext and the data ciphertext that are matched to the user attribute identifier comprised in the query condition, to obtain the data ciphertext; and receive the data ciphertext that is obtained, from the cloud computing platform.

12. The non-transitory computer-readable storage medium according to claim 11, wherein, in response to the cloud computing platform identifying, based on the permission type of the query key, that the query key comprises the permission time validity, the cloud computing platform:
sends the query request to a cloud service provider,
wherein the cloud service provider re-encrypts the index ciphertext of the data ciphertext and the data ciphertext that are matched to the user attribute identifier, in the data ciphertexts stored in the cloud computing platform; and
in response to the cloud computing platform determining that a current time of the cloud computing platform corresponds to a time that is defined by the permission time validity comprised in the query key, queries the index ciphertext that is re-encrypted and the data ciphertext that is re-encrypted, to obtain the data ciphertext.

13. The non-transitory computer-readable storage medium according to claim 11, wherein the access request further comprises a permission type of the decryption key, the permission type of the decryption key indicating whether the decryption key comprises permission time validity,
wherein the instructions further causes the computer to:
identify, based on the permission type of the decryption key, whether the decryption key comprises the permission time validity; and
decrypt the data ciphertext into the data plaintext, in response to the decryption key being identified to not comprise the permission time validity.

14. The non-transitory computer-readable storage medium according to claim 13, wherein the instructions further cause the computer to:
determine, in response to the decryption key being identified to comprise the permission time validity, whether a current time of the user terminal corresponds to a time that is defined by the permission time validity comprised in the decryption key; and
decrypt the data ciphertext into the data plaintext, in response to the current time of the user terminal being determined to correspond to the time defined by the permission time validity comprised in the decryption key.

15. The non-transitory computer-readable storage medium according to claim 11, wherein the instructions further cause the computer to receive the decryption key and the query key from an enterprise to which a user of the user terminal belongs.

* * * * *